Patented June 26, 1934

1,964,136

UNITED STATES PATENT OFFICE 1,964,136

LIGHT-SENSITIVE LAYER

Heinrich Prüfer and Karl Dulik, Vienna, Austria

No Drawing. Application June 18, 1932, Serial No. 618,083. In Austria June 24, 1931

15 Claims. (Cl. 95—7)

Most of the photographic processes require colloids for the production of the light-sensitive layers such as collodion, gelatine, glue, albumen, gum, natural or artificial resins (Doelker Austrian Patent No. 97,688) and resins produced by condensation from cyclic or monoheterocide compounds with furfurol, acetone and the like (German Patent No. 443,825). These are used, on the one hand, as carriers of the light-sensitive substance, such as for instance the gelatine in the dry-plates; on the other hand, the colloids themselves are made light-sensitive by the addition of chromates, azo-compounds etc. In the latter case, the dissolving or swelling power of the colloids for suitable dissolving or swelling agents is changed by exposure to light. Thus, for example, the gelatine, by such exposure will no longer swell in cold water nor dissolve in warm water. Glue, albumen, gum become insoluble in cold water, while the usual natural or artificial resins become insoluble in alcohol or alkalies.

These known methods have various drawbacks. Thus, for instance, in the colloids of natural origin the composition is a varying one; the sensitiveness and reliability, therefore, is in all processes very different, and as a result the developing methods are accordingly complicated and reproducible results are difficult.

According to the present invention these drawbacks mentioned above are avoided.

After many experiments, it has been found that cold or warm alkaline or acid or neutral reacting artificial resins, whether in aqueous, alcoholic or in any other suitable solvent or made liquid by heat, and being produced by condensation of aliphatic amines of the type of carbamides (urea) or thiocarbamides (thio-urea) as well as their homologues or derivatives (some of the hydrogen atoms of the carbamides or thiocarbamides being substituted by aryl-, alkyl-, acetyl-, nitro-groups and the like) with aldehydes, their polymers or compounds giving off such aldehydes, are capable of giving, in a suitably light-sensitized state, photographic results. The light-sensitiveness of these sensitized resin layers surpasses that of the colloids or resins hitherto known. A further advantage consists in the feature that urea resins made light-sensitive by chromating, for instance by the treatment with chromate, in accordance with the invention can be developed in cold water in a few minutes. None of the known photographic processes with natural or artificial resins possess these properties.

The chemical qualities of the resin layer can easily be adapted to the desired purpose, either by choosing the starting material, for instance the carbamide or thiocarbamide in which the individual hydrogen atoms of the amido-groups have been substituted, for example, by an alkyl-, aryl-, acetyl-, nitro-group or the like, or by varying the molecular aldehyde-quantities or the condensation-agent, and that according to the manner the products used are condensed, whether acid or alkaline or in the presence of, or with, salts (for instance ammonium formate) albuminous substances or phenols, or altogether without condensation means.

All of the measures mentioned permit of giving to the layer an appropriate quality. A resin which, after exposure to light, maintains its solubility in water at the places which are not exposed, is preferably used where photographic reproduction from lined and ruled negatives upon surfaces fit for printing are concerned, such as metal or stone or the like. If the solubility of the resin is diminished half-tones can be transferred upon granulated print-carriers, the division in points being effected on the granulated carrier itself. If the solubility is suppressed and the resin left solely capable of being swelled reliefs can be produced analogous to the pigment-method. From this it can be seen that the urea-resins in accordance with the invention can be furnished, according to requirements, with the properties of albumen, gum, gelatine, glue, collodion and the like. The urea-aldehyde-condensation products can be also made light-sensitive with all known means, such as chromates, diazo compounds, iron salts etc. These condensation-products can, however, also be used in dry-plates and films in place of gelatine as carrier of the light-sensitive silver halide emulsion, since also urea-aldehyde-condensation products have been obtained which, similarly to gelatine, are soluble only in warm water and not in cold water. Thus, it has been shown that the aldehyde-urea-condensation products are in all their varied forms, a very useful product for use in photography. These products have on account of their synthetic production always the same chemical qualities, which is not the case for instance with gelatine, glue, albumen, gum and the natural resins.

It has been found that the sensitized non-alkaline-reacting carbamide or thiocarbamide resins, as well as their homologues and derivatives when applied to a substratum or carrier, dry with streaks. Some portions of the carrier show after the preparation and the subsequent drying places denuded from resin, though the layer was applied in uniform manner. This phenomenon is probably due to the circumstance that the acid-reacting aldehyde-condensation products of urea, thiourea or their homologues and derivatives exhibit a tendency to condense indefinitely and to assume an insoluble state, while splitting off water. If a few drops, for instance 2 to 5 parts per thousand, of a wetting or emulsifying agent, preferably a colloid, for example albumen, dextrin etc., are added to the sensitized resin, this addition will have the effect that the layer after the drying operation will remain evenly distributed on the carrier. It is pointed out that in the present process the small amount of albumen etc. is added after the condensation and after the sensitization. In Goldschmidt's Austrian Patent No. 95,663 the albuminous substances are present during the condensation and are condensed with the other material and acts therefore as an emulsifying agent. Doelker (Austrian Patent No. 97,688) uses albumen as accelerator, which is not the case in the present method. The following two examples serve to better illustrate the present invention.

Example 1.—A copy is to be made on a plate of copper or zinc. For this purpose the metal plate is first cleaned, as usual, and over it is poured the chromated resin solution which has the following composition: 10 cc. of an urea resin containing 12 to 15% solid urea (based on the starting material) are diluted with 5 to 10 cc. water. To this are added 2 cc. of a 10 to 20% solution of ammonium dichromate, 2 drops of a 5% albumen solution and 2 drops of a 10% solution of copper bromide, the latter being an accelerator. Thereupon the plate is dried in a centrifugal machine. Then a copy is made from the ruled negative in daylight or with artificial light and developed for a few seconds under the water-jet. After the copy has been colored with an aqueous solution of a dyestuff and subsequently dried, the etching can be effected without a previous treatment with heat. In the same manner printing plates for the photo-mechanical offset-press can be made. If the amount of the accelerating agent copper bromide is increased, the sensitiveness suffices to obtain, with the aid of a projection apparatus, upon offset-printing plates photographic enlargements of lined or ruled negatives fit to be printed.

Example 2.—20 cc. of a carbamide-aldehyde-condensation product soluble only in warm water, which contains 20 to 30% solid urea (based on the starting material), is melted and emulsified in known manner with silver halide. Then it is left to cool, is cut in pieces, is thoroughly washed, as usual, and is applied in warm state to glass, film, paper, etc. in known manner and finally dried.

As used in the claims, the term "an urea" includes urea and thiourea.

What we claim is:
1. A light sensitive layer comprising a light sensitized condensation product of an urea and an aldehyde.
2. A light sensitive layer comprising a light sensitized condensation product of an urea derivative and an aldehyde.
3. A light sensitive layer comprising a condensation product of an urea and an aldehyde and containing a light sensitive substance in emulsified form distributed throughout the mass.
4. A light sensitive layer comprising a condensation product of an urea and an aldehyde light sensitized by means of a chromium salt.
5. A light sensitive layer comprising a condensation product of an urea and an aldehyde light sensitized by means of a soluble chromium salt.
6. A light sensitive layer comprising a condensation product of an urea and aldehyde light sensitized by means of a silver halide.
7. A light sensitive layer comprising a condensation product of an urea and an aldehyde light sensitized by means of a soluble iron salt.
8. A light sensitive layer comprising a light sensitized condensation product of an urea and an aldehyde and containing albumen.
9. A light sensitive layer comprising a light sensitized condensation product of an urea and an aldehyde at least swellable in water.
10. A light sensitive layer comprising a light sensitized condensation product of an urea and an aldehyde soluble in water.
11. A light sensitive layer comprising a light sensitized condensation product of an urea and an aldehyde and containing a retarder for the light action.
12. A light sensitive layer comprising a light sensitized condensation product of an urea and an aldehyde and containing an accelerator for the light action.
13. The method of preparing a light sensitized layer which comprises reacting an urea and an aldehyde, adding a small amount of ammonium dichromate and applying the composition to a carrier in the form of a smooth layer.
14. The method of preparing a light sensitized layer which comprises reacting an urea and an aldehyde and adding a small amount of a light sensitizing material and applying the composition to a carrier in the form of a layer.
15. The method of preparing a light sensitized layer which comprises reacting an urea and an aldehyde, adding a small amount of a light sensitizing material and an emulsifying agent, and then applying the composition to a support in the form of a layer.

HEINRICH PRÜFER.
KARL DULIK.